March 24, 1970     R. M. HAYS     3,502,271

IRON ORE TREATING PROCESS

Filed May 29, 1967     3 Sheets-Sheet 1

INVENTOR.
RONALD M. HAYS
BY
Burd, MacEachron, Braddock,
Bartz & Schwartz
ATTORNEYS INVENTOR.
RONALD M. HAYS
BY
*Burd, MacEachron, Braddock,*
*Bartg & Schwartz*
ATTORNEYS

United States Patent Office 3,502,271
Patented Mar. 24, 1970

3,502,271
IRON ORE TREATING PROCESS
Ronald Martin Hays, Golden Valley, Minn., assignor to The Regents of the University of Minnesota, Minneapolis, Minn., a corporation of Minnesota
Filed May 29, 1967, Ser. No. 641,867
Int. Cl. B03b 7/00; C21b 1/08; B03c 1/30
U.S. Cl. 241—20               11 Claims

ABSTRACT OF THE DISCLOSURE

A process for the beneficiation of low-grade iron ore containing principally goethite and hematite to produce a concentrate of uniform chemical composition and structure from which pellets containing at least 60 percent iron and 7 percent or less of silica and preferably at least 65 percent iron and 5 percent or less of silica can be produced. The concentrate is produced by crushing and grinding the ore to liberation size and subjecting in a series of steps to wet high-intensity magnetic separation, cationic silica flotation and anionic silica flotation.

---

This invention is based at least in part upon work done under a contract or grant from the United States Government. The Government has the right to require the granting of licenses within the United States to applicants on a non-exclusive, royalty-free basis if the contractor, his licensee, or his assignee has failed to take effective steps within three years after a patent issues on the invention, to bring the invention to the point of practical application or to make the invention available for licensing royalty-free or on terms that are reasonable within the circumstances, unless the contractor can show cause why the granting of such licenses should not be required by the Government for a further period of time.

The Regents of the University of Minnesota, contractor under Economic Development Administration Contract No. Cc–6158 and as assignee of this invention reserves to the United States Government a world-wide royalty-free non-exclusive license for all governmental purposes.

During the twentieth century, the Mesabi Range in Northeastern Minnesota has been the main source of iron ore for American steel mills. The Mesabi Range extends along an iron-bearing outcrop known as the Biwabik Formation. This outcrop is some 120 miles long and up to 3 miles wide. The formation is from 200 to 650 feet thick and dips 5 to 10 degrees to the southeast. The Biwabik Formation is divided into four stratigraphic units. From top to bottom these are the Upper Slaty, Upper Cherty, Lower Slaty, and Lower Cherty. Although the iron content of the original Biwabik Formation is quite uniform, major variations occur in mineral composition. Since deposition of the pre-Cambrian sedimentary formation, most of the original Biwabik Formation has been subject to alteration. Thus, there are major variations in the present Biwabik Formation both laterally along the length of the formation and vertically within the units.

The remaining unaltered iron formation includes the magnetic taconites which now are commercially processed at the rate of 22.6 million tons per year of iron pellets. With planned construction of new plants and expansion of present operations, by 1977 approximately 60 million tons per year of iron pellets will probably be produced from magnetic taconite on the Mesabi Range.

The portions of the Biwabik Formation subjected to intense alteration resulted in direct shipping, wash, and heavy-media ores. Since 1892, 1.8 billion tons of direct shipping ore have been shiped from the Mesabi Range. This ore has been the major source of iron ore for American steel mills. In 1965, 10 million tons of direct shipping ore and 20 million tons of wash, jig, heavy-media, and other gravity concentrates were shipped from the Mesabi Range. These products generally have poorer physical and chemical properties than the iron pellets produced from magnetic taconite. It is predicted that the shipment of these materials will decrease from 30 million tons in 1965 to 6 to 8 million tons in 1975. This decrease will be due to depletion of reserves and poor product quality.

A substantial portion of the Biwabik Formation subjected to moderate alteration has resulted in oxidized taconite and semitaconite. Oxidized taconite represents the earliest phase of alteration and involves the oxidation in situ of most of the original iron minerals without appreciable leaching of the silica. Semitaconite represents the next phase of alteration and involves the leaching of some silica and a weakening of the material.

At the present, oxidized taconite and semitaconite are not processed, except in very limited tonnages. Thus these materials either have been stockpiled during present mining operations or left unmined. The reserves of oxidized taconite and semitaconite are so large that reliable estimates have never been made. It is estimated that by 1990 shipments from the Mesabi Range will approach 75 million tons per year. To achieve estimated future production these oxidized taconite and semitaconite reserves must be processed.

The processing of oxidized taconite and semitaconite has been studied for many years. To meet future market requirements, the concentrates must be made into a pellet containing 7 percent or less silica and preferably 5 percent or less. Three general beneficiation schemes are being considered. The first of these is magnetic roasting which reduces the iron oxides to magnetite and then separates the magnetite and gangue by magnetic separation. The first experimental plant on the Mesabi Range was built in 1934. Since then several experimental plants have been constructed and operated. However, this process has not become commercial on the Mesabi Range because of the high capital and operating costs of the process and the large reserves of magnetic taconite.

The second general beneficiation scheme being considered is flotation. One of the first experimental flotation plants was at the Canisteo in 1946. More recently the U.S. Bureau of Mines has evaluated various samples in their pilot plant. These flotation studies indicate that high-grade concentrates for the production of pellets containing 7 percent or less silica were not produced from many Mesabi oxidized taconite and semitaconite samples. Thus, a third general beneficiation scheme was developed which did not have the high capital cost of magnetic roasting or the inability of flotation to process ores of various composition.

The third general process uses high-intensity magnetic separation and flotation. This process is described generally in a related copending application of James E. Lawver, Ser. No. 376,338 filed June 19, 1964, for Iron Ore Beneficiation Process, now Patent No. 3,337,328 issued Aug. 22, 1967, and in a paper co-authored by applicant entitled "Progress Report on Semitaconite Beneficiation" published in Mining Congress Journal for March 1966. The present invention is directed to an improved ccommercially feasible beneficiation process utilizing high intensity magnetic separation and flotation.

The principal object of the present invention is to provide a process for commercial beneficiation of oxidized taconite and semitaconite to produce a concentrate of uniform chemical composition and structure which is suitable for agglomeration and, to meet future blast furnace requirements, ccontains 60 percent or more iron and 7 percent of less silica.

The invention is illustrated in the accompanying drawings in which.

The oxidized taconite and semitaconite materials are either in reject stockpiles or in situ. The primary iron minerals are goethite and hematite. The reject stockpile reserves are substantial, but these have been made in a random manner with regard to concentrating characteristics. The material in situ has considerable variation both laterally and vertically. The selective mining of material in situ or the use of a blending system would be expensive. Because many materials would require grinding to 80 to 90 percent minus 325 mesh for liberation, all materials would have to be ground this fine. Therefore, the principal objective in developing a new process were:

(1) A standardized process of general application capable of producing a uniform concentrate containing 60 percent or more iron and 7 percent or less silica from the various types of oxidized taconite and semitaconite, whatever their source, and (2) A process capable of processing material ground to 80 to 90 percent minus 325 mesh.

Figure 1:
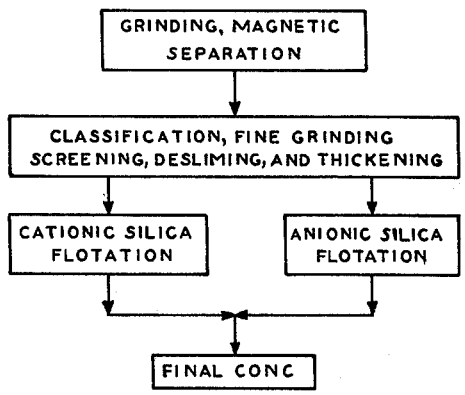
FIGURE 1 is a schematic illustration of the broad basic ore beneficiation process according to the present invention.

The basic process for beneficiating oxidized taconite and semitaconite is broadly illustrated schematically in FIGURE 1. The crude material is crushed and ground. The ground product is then concentrated by low-, intermediate-, and high-intensity magnetic separators. The magnetic concentrates are classified and finely ground. The ground product is then deslimed. The deslimed material is concentrated by cationic silica flotation. The slimes are thickened and concentrated by anionic silica flotation. The cationic and anionic silica flotation concentrates may be utilized separately or they may be combined for the final concentrate.

Figure 2:
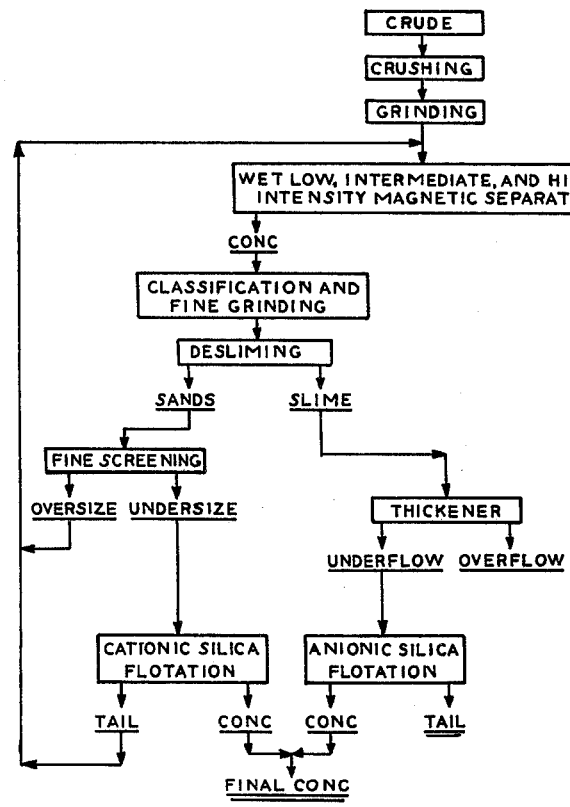
FIGURE 2 is a more detailed exemplary schematic flow sheet of a process for the beneficiation of crude oxidized taconite or semitaconite ore; or for the treatment of tailings from previous separation or concentration processes; or upgrading the concentrate product of present concentrating plants.

More specifically, as illustrated in the flowscheme of FIGURE 2, the crude iron ore material is treated according to the present invention as follows: The crude material is crushed to minus 1 inch and then ground in a wet rod mill. The ground product is processed by wet low-, and intermediate-, and high-intensity magnetic separators to remove any magnetite or particles with magnetite inclusions. The tailings from the intermediate-intensity separator are processed in the high-intensity separators. The tailings from the wet high-intensity magnetic separators are discarded. All the magnetic concentrates are then combined for classification and grinding using a ball mill close circuited by a cyclone. The finely ground product is deslimed using a cyclone. The slime is thickened and the thickener underflow is concentrated by anionic silica flotation. The thickener overflow is discarded. The deslimed product is screened on a fine screen so that a higher final concentrate grade is attained when the undersize is concentrated by cationic silica flotation.

The screen is an iso-rod screen with 0.004-inch openings. This screen removes almost all plus 200 mesh material from the cationic flotation feed. Since the coarse silica is not easily floated, the removal of this material significantly improves the cationic flotation concentrate grade. The screen oversize is returned to a high-intensity magnetic separator which rejects the coarse silica and recovers the iron minerals for additional grinding. The screen undersize is dewatered by a cyclone and then processed by cationic silica flotation. The concentrates from cationic and anionic silica flotation may be combined for the final concentrate. Pellets produced from the combined concentrates from cationic and anionic silica flotation contain less than 7 percent silica, and more than 60 percent iron, and up to 80 percent of the iron units in the crude.

To improve iron recovery, the cationic flotation tailing is returned along with the screen oversize to the high-intensity magnetic separator. Since the high-intensity magnetic separator is very efficient for recovering goethite and hematite particles of this size, almost all of the iron values previously lost in this product are now recovered. This modification increases overall iron recovery and permits the production of various cationic flotation concentrate grades with essentially the same iron recovery. By increasing reagent quantities, a higher grade concentrate can be obtained. The grade and weight of the cationic flotation tailing also are increased, but the iron values in this tailing are not lost because these values are recovered by the high-intensity magnetic separator. However, processing this material requires additional high-intensity magnetic separation capacity.

The development of the high-intensity magnetic separation and flotation process is illustrated in detail using three bulk semitaconite samples. Within each of these samples there is a variation in the degree of alteration. All three samples were originally from the Lower Cherty Member of the Biwabik Formation. Since there are major variations in the Biwabik Formation both laterally and vertically, the commercial operation will be processing ores of various degrees of alteration.

The sample of Example I containing about 36 percent total iron was taken from a reject stockpile of material not amenable to wash or heavy-media processing. However, because of the intense alteration this sample bordered on being a heavy-media ore. The sample contained a substantial quantity of coarse-grained goethite that had been formed by the migration of iron in solution and its later precipitation along bedding planes and void spaces developed by the contemporaneous leaching of silica. The relatively pure goethite occurred in layers ranging in thickness from one inch to less than ⅛ inch. Goethite was also present as a secondary filling in 65 to 150 mesh pores. The sample contained important quantities of hematite, derived from the oxidation of magnetite. The oxidation of the magnetite did not entail any change in grain size. However, secondary goethite had been precipitated in and silica leached from these hematite layers. Thus the enrichment of these hematite layers caused a coarsening of the effective grain size for liberation.

The sample of Example II containing approximately 31 percent total iron was taken from another reject stockpile. This sample was similar to the sample of Example I except that only moderate oxidation had occurred. Precipitation of goethite and leaching of silica were not as extensive as in Example I; however, substantial liberation occurred at 65 mesh for both Examples I and II.

The sample of Example III containing approximately 37 percent total iron was taken from a bank of exposed oxidized taconite. This sample was a heterogeneous material with the iron minerals being primarily hematite with lesser amounts of goethite. A large portion of the hematite was derived from the oxidation of magnetite. The primary gangue mineral was quartz which occurred in massive chert layers and in association with the iron-rich layers. Substantial liberation occurred at 200 mesh. During the development program and subsequent testing program for the high-intensity magnetic separation and flotation process, approximately 500 tons of semitaconite and oxidized taconite material was processed. The metallurgical results obtained using the three samples are presented below. The results presented are typical of those obtained and have been substantiated by additional tests.

Figure 3:
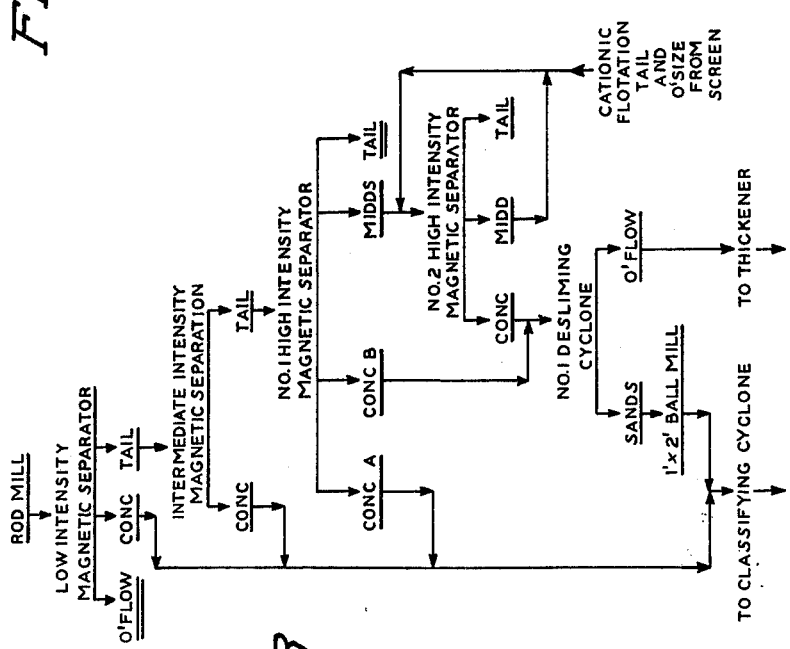
FIGURE 3 is a still more detailed flowscheme of the primary grinding and magnetic separation circuit of the overall flowscheme.

In each of the examples the samples were processed through the four circuits comprising the process flowscheme, as illustrated in FIGURES 3 through 6. The primary grinding and magnetic separation portion of the flowscheme is shown in FIGURE 3. The crushed material was wet ground in a rod mill. The mill discharge was processed wet by low- and intermediate-intensity magnetic separators to remove any magnetite or particles with magnetite inclusions. The low-intensity separator was operated with a slight overflow to remove tramp material such as wood chips and straw. The removal of this tramp material was important since tramp material will eventually plug the high-intensity magnetic separator. Since the wet high-intensity magnetic separator used is a two pole-pair machine, the first pole-pair was designated the No. 1 high-intensity magnetic separator and the second pole-pair was designated the No. 2 high-intensity magnetic separator. The No. 1 high-intensity magnetic separator produced concentrate A, concentrate B, middling, and final tailing. Most of the concentrate was recovered in concentrate A. Concentrate B contained coarser material which was recovered by using a large quantity of wash water.

The middling product along with other products (cationic flotation tailing, screen oversize, and No. 2 high-intensity separator middling) were re-treated in the No. 2 high-intensity magnetic separator. This separator produced concentrate, middling, and final tailing. The middling product from this No. 2 high-intensity magnetic separator was recirculated to this same separator. The concentrate from this separator and concentrate B from the No. 1 high-intensity magnetic separator were dewatered in the No. 1 desliming cyclone. The cyclone underflow, which contained coarse material, was ground in a 1-foot by 2-foot ball mill. The discharge from the small ball mill, the low-intensity magnetic separator concentrate, the intermediate-intensity magnetic separator concentrate, and the No. 1 high-intensity magnetic separator concentrate A were combined and pumped to the classifying cyclone. The overflow from the No. 1 desliming cyclone was laundered to the thickener ahead of the anionic silica flotation circuit.

Figure 4:
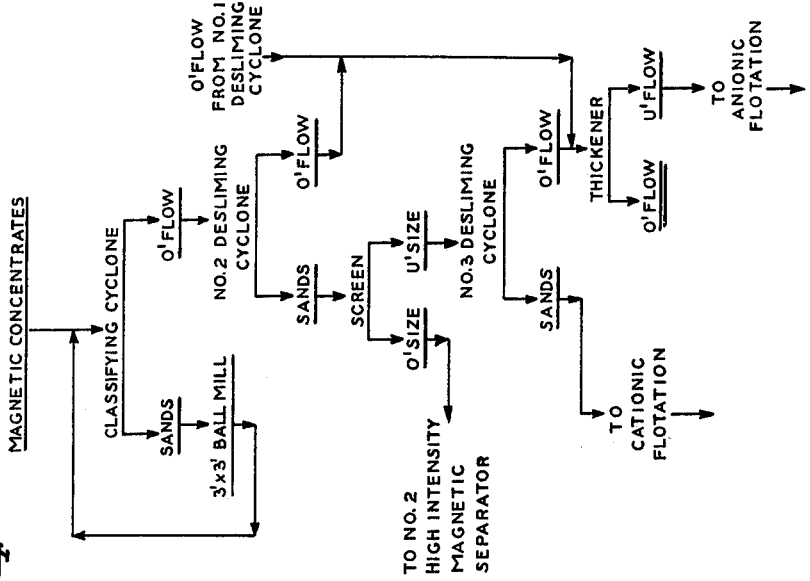
FIGURE 4 is a flow scheme of the classification, fine grinding, screening, desliming and thickening circuit.

The classification, fine grinding, screening, desliming, and thickening portion of the flowscheme is shown in FIGURE 4. The magnetic concentrates were classified in a cyclone operated in closed circuit with the 3-foot by 3-foot ball mill. The overflow from the classifying cyclone was deslimed in the No. 2 desliming cyclone. The underflow from the No. 2 desliming cyclone was screened on an iso-rod screen with 0.004-inch openings. The oversize from this screen was retreated in the No. 2 high-intensity magnetic separator. The undersize from this screen was dewatered in the No. 3 desliming cyclone. The underflow from the No. 3 desliming cyclone was processed by cationic silica flotation.

The overflows from all the desliming cyclones were combined for thickening. The major portion of the slime was in the No. 2 desliming cyclone overflow. The other two desliming cyclones were used primarily for dewatering. Causticized starch was added to the thickener to flocculate the slimes. After thickening, the slimes were processed by anionic silica flotation.

Figure 5:
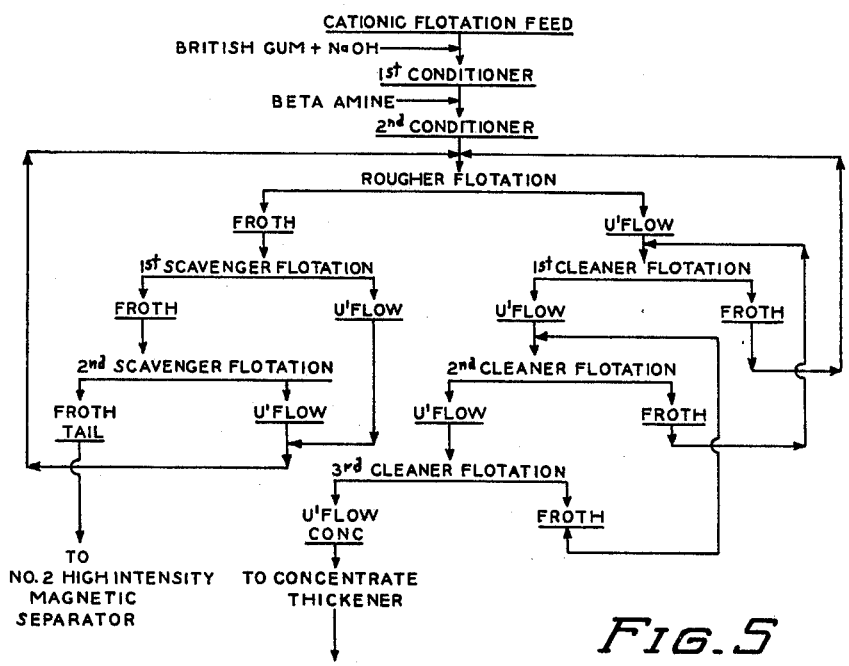
FIGURE 5 is a flowscheme of the cationic silica flotation circuit.

The cationic silica flotation portion of the flowscheme is shown in FIGURE 5. The reagents used in cationic flotation were causticized starch in the first conditioner and amine in the second conditioner. The pH was controlled at approximately 10 during conditioning. Several flotation circuits were evaluated. Although the various flotation circuits produced different metallurgical results, these differences did not greatly affect the metallurgical results obtained by the process. The circuit shown in FIGURE 5 is the last circuit evaluated and the circuit used to obtain the results presented. This circuit has a rougher stage, two scavenger stages, and three cleaner stages. The tailing from the second scavenger stage was returned to the No. 2 high-intensity magnetic separator. The concentrate was the underflow from the third cleaner stage.

Figure 6:
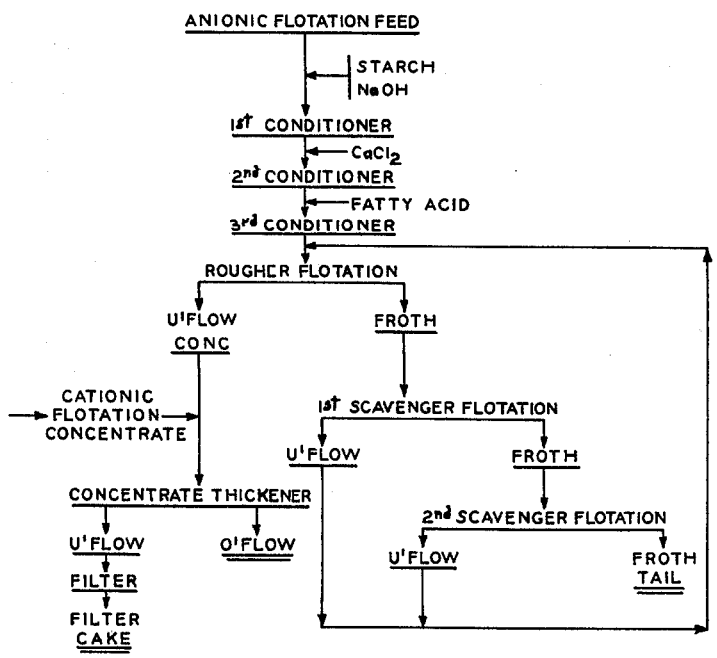
FIGURE 6 is a flow scheme of the anionic silica flotation circuit.

The anionic silica flotation portion of the flowscheme is shown in FIGURE 6. The anionic flotation feed was conditioned in three stages. Causticized pearl starch was added in the first stage; calcium chloride was added in the second stage; and fatty acid was added in the third stage. Several flotation circuits were evaluated. Although the various flotation circuits produced different metallurgical results, these differences did not greatly affect the metallurgical results obtained by the process. The circuit shown in FIGURE 6 is the last circuit evaluated and the circuit used to obtain the results presented. The circuit has a rougher stage and two scavenger stages. The underflows from the two scavenger stages were returned to the rougher stage. The final tailing was the froth from the second scavenger stage. The concentrate was the underflow from the rougher stage. The cationic and anionic silica flotation concentrates were combined and thickened. The concentrates thickener underflow was then filtered.

The metallurgical results of all final products are presented in Table I. The feed rate to the pilot plant, which was determined by the capacity of the grinding mills, ranged from 0.73 to 0.93 long ton per hour for Examples III and II, respectively. For the two tests of Example I, the feed rate was 0.89 and 0.87 long ton per hour. The rod mill discharge was essentially minus 35 mesh, which is a fine rod mill grind. If a grind this fine is required, a more desirable flowscheme might use a rod mill and a ball mill or an autogenous mill to improve grinding efficiency. Another approach is to modify the flowscheme to permit a coarser material to be processed by high-intensity magnetic separation.

All of these samples contained only minor quantities of highly magnetic material as indicated by the small portion of the crude weight in the low-intensity magnetic separator concentrate. The crude iron units recovered in the intermediate-intensity magnetic separator concentrate were 11 percent, 15 percent, and 29 percent for Examples I, II and III, respectively. This is to be expected because, as the degree of alteration decreases, the quantity of magnetite and particles with magnetite inclusions should increase.

The No. 1 high-intensity magnetic separator rejected 19 to 27 percent of the crude weight as a tailings containing from 12 to 16 percent iron. The highest iron tailing was obtained when processing the sample of Example I which had been subjected to intense alteration and exhibited a greater tendency to slime than the other In the classification and grinding portion of the flow-scheme, the circulating load for the 3-foot by 3-foot ball mill was as high as 640 percent. This high circulating

TABLE I.—METALLURGICAL RESULTS

| | Example | | | | | | | | | | | |
|---|---|---|---|---|---|---|---|---|---|---|---|---|
| | I-A | | | I-B | | | II | | | III | | |
| | Percent Wt. | Percent Fe | Percent Fe Rec. | Percent Wt. | Percent Fe | Percent Fe Rec. | Percent Wt. | Percent Fe | Percent Fe Rec. | Percent Wt. | Percent Fe | Percent Fe Rec. |
| Crude | 100.00 | 35.51 | 100.00 | 100.00 | 36.27 | 100.00 | 100.00 | 31.05 | 100.00 | 100.00 | 36.74 | 100.00 |
| Low-intensity magnetic separator overflow | 0.90 | 31.65 | 0.80 | 0.41 | 33.59 | 0.38 | 0.00 | | 0.00 | 0.12 | 24.93 | 0.08 |
| No. 1 high-intensity magnetic separator tailing | 19.31 | 14.42 | 7.84 | 24.79 | 15.79 | 10.79 | 26.26 | 12.04 | 10.18 | 27.22 | 12.69 | 9.40 |
| No. 2 high-intensity magnetic separator tailing | 28.39 | 12.04 | 9.63 | 23.26 | 12.29 | 7.89 | 26.55 | 10.17 | 8.70 | 19.48 | 11.96 | 6.34 |
| Cationic silica flotation concentration | 28.39 | 63.25 | 50.56 | 26.95 | 63.93 | 47.50 | 24.87 | 63.11 | 50.55 | 31.52 | 65.71 | 56.37 |
| Thickener overflow | 0.35 | 50.40 | 0.50 | 0.72 | 51.55 | 1.02 | 0.53 | 44.00 | 0.75 | 0.79 | 49.66 | 1.07 |
| Anionic silica flotation concentrate | 18.10 | 56.43 | 28.76 | 15.71 | 59.40 | 25.73 | 13.38 | 58.24 | 26.98 | 13.22 | 58.37 | 21.01 |
| Anionic silica flotation tailing | 4.56 | 14.89 | 1.91 | 7.80 | 28.89 | 6.21 | 7.41 | 11.90 | 2.84 | 7.65 | 27.58 | 5.74 |
| Final concentrate | 46.49 | 60.59 | 79.32 | 42.66 | 62.26 | 73.23 | 39.25 | 61.33 | 77.53 | 44.74 | 63.54 | 77.38 | samples. An examination of the screen analyses shows that 85 to 95 percent of the iron values in these tailings are in the minus 325-mesh fraction. The iron content of the minus 325-mesh fraction ranges from 17 to 24 percent iron with this value also being highest for Example I. The iron content of the plus 325-mesh fraction ranges from 2.2 to 4.5 percent iron. As an average for these tests, the plus 325-mesh fraction of the tailing contained 8.8 percent of the crude weight and only 0.84 percent of the iron units loss. Thus the wet high-intensity magnetic separator was very efficient in rejecting plus 325-mesh gangue.

The No. 2 high-intensity magnetic separator rejected 19 to 28 percent of the crude weight as a tailing containing from 10 to 12 percent iron. An examination of the screen analyses shows that 74 to 92 percent of the iron values in these tailings were in the minus 325-mesh fraction. The iron content of the minus 325-mesh fractions ranged from 13 to 17 percent iron while the plus 325-mesh fractions contained only 3 to 6 percent iron. The plus 325-mesh fractions rejected an average of 8.9 percent of the crude weight and only 1.1 percent of the iron units in the crude. Thus the wet high-intensity magnetic separator was again very efficient in rejecting plus 325-mesh gangue.

The tailings from both stages of high-intensity magnetic separation contained 11 to 15 percent iron and rejected from 47 to 53 percent of the crude weight. Iron losses ranged from 16 to 19 percent of the iron units in the crude. An average of 89 percent of the iron units in these tailings were in the minus 325-mesh fraction. The minus 325-mesh fraction contained an average of 17.6 percent iron and the plus 325-mesh fraction contained an average of only 3.7 percent iron.

Before grinding in the 1-foot by 2-foot ball mill, the No. 2 high-intensity magnetic separator concentrate B and the No. 2 high-intensity magnetic separator concentrate were dewatered in the No. 1 desliming cyclone. The overflow from this cyclone contained from 1.2 percent to 2.6 percent of the crude weight. The sands from this cyclone were ground in the 1-foot by 2-foot ball mill before being classified and ground in the 3-foot by 3-foot ball mill because these sands contained some coarse material from concentrate B. Better metallurgical results were obtained because the feed to the classifying cyclone had a narrower size consist. Thus classification in the cyclone was more efficient.

load was necessary to maintain the percent solids in the classifying cyclone feed at the desired level for making a 150 mesh to 200 mesh separation. The classifying cyclone overflow was 40 to 50 percent minus 325 mesh.

The classifying cyclone overflow was deslimed in the No. 2 desliming cyclone. This overflow contained from 19 to 20 percent of the crude weight. These slimes contained from 43 to 50 percent iron and were essentially minus 10 to 12 microns.

The screening of the No. 2 desliming cyclone sands removed most plus 200-mesh material from the cationic silica flotation feed. Although the screening efficiency was poor and the oversize and undersize products have essentially the same iron content, the cationic silica flotation concentrate was substantially upgraded by using the screen. The screen oversize which was returned to the No. 2 high-intensity magnetic separator varied from 14 to 69 percent of the crude weight.

The screen undersize was dewatered in the No. 3 desliming cyclone. The cyclone overflow contained from 0.9 to 2.0 percent of the crude weight. The cyclone sands represented from 45 to 58 percent of the crude weight and contained 41 to 52 percent iron.

The No. 3 desliming cyclone sands were upgraded by cationic silica flotation. The reagent consumption is presented in Table II. For the results presented, the quantity of causticized starch (British Gum 9084) added in the first conditioner was fairly constant. However, bench scale tests indicate that the quantity of causticized starch could be substantially reduced, but this was not evaluated in the pilot plant testing. The quantity of amine (Duomeen L-11) added in the second conditioner varied dependent upon the desired concentrate grade. Amine was usually added in smaller quantities at the various cleaning stages. For the results presented, the quantity of amine ranged from 0.2 to 0.5 pound per ton of flotation feed. The grade of the cationic silica flotation concentrate was easily controlled by the operator. Since this material contained very little slime, small differences in concentrate grade could be easily determined by visual examination, and concentrate grade could be increased by increasing the amine addition. Concentrates containing less than 2 percent silica were produced. For the results presented, the cationic silica flotation concentrates recovered from 25 to 32 percent of the weight and 48 to 56 percent of the iron units in

TABLE II.—REAGENT CONSUMPTION

| | Example | | | | | | | | | | | |
|---|---|---|---|---|---|---|---|---|---|---|---|---|
| | I-A | | | I-B | | | II | | | III | | |
| | LT/hr. feed | Reagents | | LT/hr. feed | Reagents | | LT/hr. feed | Reagents | | LT/hr. feed | Reagents | |
| | | Lb./LT feed | Lb./LT crude | | Lb./LT feed | Lb./LT crude | | Lb./LT feed | Lb./LT crude | | Lb./LT feed | Lb./LT crude |
| Crude | 0.8901 | | | 0.8696 | | | 0.9281 | | | 0.7379 | | |
| Cationic silica: | | | | | | | | | | | | |
| Flotation | 0.4388 | | | 0.3973 | | | 0.4173 | | | 0.4286 | | |
| NaOH | | 0.51 | 0.25 | | 0.55 | 0.25 | | 0.53 | 0.24 | | 0.68 | 0.40 |
| Gum 9084 [1] | | 1.81 | 0.89 | | 2.00 | 0.91 | | 1.93 | 0.87 | | 1.64 | 0.96 |
| Duomeen L-11 [2] | | 0.27 | 0.13 | | 0.39 | 0.18 | | 0.17 | 0.07 | | 0.50 | 0.29 |
| Thickener | 0.2049 | | | 0.2107 | | | 0.2071 | | | 0.1598 | | |
| NaOH | | 0.65 | 0.15 | | 0.63 | 0.15 | | 0.65 | 0.15 | | 0.83 | 0.18 |
| Pearl Starch 3001 [1] | | 0.65 | 0.15 | | 0.63 | 0.15 | | 0.65 | 0.15 | | 0.83 | 0.18 |
| Anionic Silica: | | | | | | | | | | | | |
| Flotation | 0.2018 | | | 0.2045 | | | 0.2022 | | | 0.1540 | | |
| NaOH | | 7.24 | 1.64 | | 11.64 | 2.74 | | 9.68 | 2.11 | | 11.17 | 2.33 |
| Pearl Starch 3001 [1] | | 7.24 | 1.64 | | 11.64 | 2.74 | | 9.68 | 2.11 | | 11.17 | 2.33 |
| Calcium Chloride | | 2.83 | 0.64 | | 2.20 | 0.52 | | 2.98 | 0.65 | | 2.75 | 0.57 |
| Acintol FA-2 [3] | | 2.69 | 0.61 | | 2.43 | 0.81 | | 2.65 | 0.58 | | 4.29 | 0.90 |
| Concentrate thickener | | | | | | | 0.3643 | | | 0.3304 | | |
| Calcium chloride | | | | | | | | 0.755 | 0.30 | | 0.80 | 0.36 |

[1] Corn Products Company.   [2] Armour Industrial Chemical Company.   [3] Arizona Chemical Company.

the crude. The concentrates contained from 63.1 to 65.7 percent iron and 2.3 to 3.5 percent silica.

The slimes from all three desliming cyclones represented from 22 to 24 percent of the crude weight. These slimes were thickened using causticized starch (Pearl Starch 3001) as a flocculant. The thickener underflow was concentrated by anionic silica flotation. The reagent consumption is presented in Table II. Because this material was very fine, the reagent consumption was high. For the results presented, starch consumption ranged from 7.2 to 11.2 pounds per ton of flotation feed, calcium chloride consumption ranged from 2.2 to 3.0 pounds per ton of flotation feed, and fatty acid consumption ranged from 2.4 to 4.3 pounds per ton of flotation feed. During the pilot plant testing, these reagent quantities were not optimized, but further testing should substantially reduce the quantities required. Control of the anionic silica flotation circuit was difficult because of the fineness of the material and grade distinctions could not be made by visual observations. For the results presented, the anionic silica flotation concentrates recovered from 13 to 18 percent of the weight and from 21 to 29 percent of the iron units in the crude. These concentrates contained from 56.4 to 59.4 percent iron and 7.3 to 11.1 percent silica.

The cationic and anionic silica flotation concentrates were combined, thickened, and filtered. When processing the samples of Examples II and III, the combined or final concentrate was easily filtered in the pilot-plant disc filter. The concentrate produced from the sample of Example I was not successfully filtered in the pilot-plant filter, but bench-scale tests indicated that this concentrate could be filtered if thickened to approximately 70 percent solids before filtration.

For Example I, the results of two tests are presented. In the first test, the combined or final concentrate recovered 46.5 percent of the weight and 79.3 percent of the iron units in the crude. The final concentrate was 82.0 percent minus 325 mesh and contained 60.6 percent iron and 6.5 percent silica. The second test produced a final concentrate containing 1.7 percent more iron (62.3 percent iron) and 2.4 percent less silica (4.1 percent silica). However, weight recovery dropped 3.8 percent to 43.2 percent and iron recovery dropped 6.1 percent to 73.2 percent. The fineness of the product was essentially the same as for the first test.

The results presented for Example II show that the final concentrate recovered 39.3 percent of the weight and 77.5 percent of the iron units in the crude. The lowest weight recovery was obtained with Example II because it contained the least iron (31 percent iron). The final concentrate was 77.7 percent minus 325 mesh. This concentrate contained 61.3 percent iron, 4.6 percent silica and 0.9 percent manganese.

Using the sample of Example III, the final concentrate recovered 44.7 percent of the weight and 77.4 percent of the iron units in the crude. This final concentrate contained 63.5 percent iron and 4.7 percent silica. Since the sample of Example II was the least altered of the samples, a grind of 88 percent minus 325 mesh was required for liberation.

Pelletizing studies have been made using final concentrates produced from all of the samples. These studies indicate that satisfactory ½-inch green balls can be made with or without bentonite from concentrates containing about 10 percent moisture. This moisture level is 4 to 7 percent lower than the filter cake moisture. Firing tests made with and without bentonite were made in a divided 6-inch diameter pot. The firing cycle was as follows:

(1) Drying for 15 minutes using a gas velocity of 300 feet per minute.
(2) Preheating for 10 minutes using a gas velocity of 200 feet per minute.
(3) Firing at designated temperature for 30 minutes using a gas velocity of 200 feet per minute.

The firing tests indicate that pellets with high strength and resistance to abrasion can be made from the final concentrates.

A summary of the metallurgical results are presented in Table III. Pellets containing approximately 65 percent iron and 5 percent silica have been produced from all three samples. The iron recovery was 73 to 78 percent with the lowest recovery for the most altered sample. The ratio of concentration has ranged from 2.3 to 2.7 with the highest ratio of concentration for the sample of lowest iron content. These results have shown that Mesabi Range semitaconites can be processed to produce pellets of satisfactory chemical and physical qualities by the high-intensity magnetic separation and flotation process.

Although the invention has been described with reference to particular flotation reagents, these were selected on the basis of individual preference and availability rather than criticality. Functionally equivalent reagents known to technicians in the flotation arts may be utilized without departing from the spirit and scope of the invention.

TABLE III.—SUMMARY OF RESULTS

| | Example | | | |
|---|---|---|---|---|
| | I-A | I-B | II | III |
| Crude, percent Fe | 35.51 | 36.27 | 31.05 | 36.74 |
| Cationic silica flotation concentrate: | | | | |
| Percent wt | 28.39 | 26.95 | 24.87 | 31.52 |
| Percent Fe | 63.25 | 63.93 | 63.11 | 65.71 |
| Percent SiO₂ | 3.51 | 2.39 | 3.10 | 2.29 |
| Percent Fe recovery | 50.56 | 47.50 | 50.55 | 56.37 |
| Percent-325 mesh | 72.74 | 71.77 | 64.80 | 82.49 |
| Anionic silica flotation concentrate: | | | | |
| Percent wt | 18.10 | 15.71 | 14.38 | 13.22 |
| Percent Fe | 56.43 | 59.40 | 58.24 | 58.37 |
| Percent SiO₂ | 11.14 | 7.12 | 7.25 | 10.40 |
| Percent Fe recovery | 28.76 | 25.73 | 26.98 | 21.01 |
| Percent-325 mesh | 96.44 | 94.51 | 99.96 | 99.97 |
| Final concentrate: | | | | |
| Percent wt | 46.49 | 42.66 | 39.25 | 44.74 |
| Percent Fe | 60.59 | 62.26 | 61.33 | 63.54 |
| Percent SiO₂ | 6.48 | 4.13 | 4.62 | 4.69 |
| Percent Fe recovery | 79.32 | 73.23 | 77.53 | 77.38 |
| Percent-325 mesh | 81.97 | 80.14 | 77.68 | 87.65 |
| Surface area cm.²/gm | | | 2250 | 2114 |
| Pellet: | | | | |
| Percent wt | 44.32 | 40.51 | 37.37 | 43.22 |
| Ratio of concentration | 2.26 | 2.47 | 2.68 | 2.31 |
| Percent Fe | 63.56 | 65.56 | 64.42 | 65.78 |
| Percent SiO₂ | 7.05 | 4.56 | 5.11 | 5.10 |

It is apparent that many modifications and variations of this invention as hereinbefore set forth may be made without departing from the spirit and scope thereof.

I claim:

1. A process for the beneficiation of low-grade iron ore material containing iron principally in the form of goethite and hematite to produce a concentrate of at least about 60 percent iron and no more than about 7 percent silica, which process comprises:
  (A) crushing and grinding the crude ore material to free at least a portion of the waste particles,
  (B) magnetically separating the iron minerals from the freed waste product to form an initial crude magnetic concentrate,
  (C) regrinding at least the coarser fractions of said initial magnetic concentrate,
  (D) desliming, screening and dewatering the initial magnetic concentrate to prepare a feed for cationic silica flotation,
  (E) recycling screen oversize from screening for further magnetic separation,
  (F) subjecting the cationic flotation feed to cationic silica flotation,
  (G) recycling the tailing from cationic flotation for further magnetic separation,
  (H) thickening slime from desliming and dewatering for anionic silica flotation,
  (I) subjecting the thickened slime to anionic silica flotation, and
  (J) recovering the concentrates from said cationic and anionic silica flotation.

2. A process according to claim 1 further characterized in that said crude iron ore material is initially ground to about 80 to 90 percent minus 325 mesh.

3. A process according to claim 1 further characterized in that said magnetic separation is carried out in a plurality of stages of low-intensity, intermediate-intensity and high-intensity.

4. A process according to claim 3 further characterized in that:
  (A) the ground crude iron ore material is first subjected to low-intensity magnetic separation into concentrate and tailings,
  (B) the tailings from the low-intensity magnetic separation are subjected to intermediate-intensity magnetic separation into concentrate and tailings,
  (C) the tailings from the intermediate-intensity magnetic separation are subjected to first high-intensity magnetic separation into first and second concentrate fractions and middlings and removed from tailings,
  (D) said middlings along with cationic flotation tailings and screen oversize are subjected to second high-intensity magnetic separation into concentrate and middlings and removed from tailings,
  (E) said second high-intensity magnetic separation middlings are recycled for further subjection to said second high-intensity magnetic separation,
  (F) said second concentrate fraction from said first high-intensity magnetic separation and said concentrate from said second high-intensity magnetic separation are combined and deslimed and classified into slime containing finely ground product and coarser sands, and
  (G) said deslimed sands are reground and combined with the concentrates from the low- and intermediate-intensity magnetic separations and the first high-intensity magnetic separation fraction into a final magnetic concentrate.

5. A process according to claim 4 further characterized in that:
  (A) the final magnetic concentrate is classified into coarse and fine fractions,
  (B) the coarse fraction is reground and recycled for reclassification, and
  (C) the fine fraction is deslimed.

6. A process according to claim 1 further characterized in that:
  (A) the undersize fine screen deslimed sands constituting the cationic flotation feed is conditioned with causticized starch and with amine,
  (B) said conditioned flotation feed is subjected to an initial rougher flotation stage,
  (C) the final froth product from the cationic flotation circuit is the cationic silica flotation tailings recycled for further magnetic separation,
  (D) the final underflow product from the cationic flotation circuit is recovered as the cationic silica flotation concentrate.

7. A process according to claim 6 further characterized in that:
  (A) the froth from said initial rougher flotation stage is subjected to at least one scavenger flotation stage, and
  (B) the underflow from said initial rougher flotation is subjected to at least one cleaner flotation stage.

8. A process according to claim 6 further characterized in that:
  (A) said starch is present in amount between about 1.0 to 2.0 pounds per ton of cationic silica flotation feed,
  (B) caustic is present in between about 0.27 to 0.68 pound per ton of feed, and
  (C) amine is present in amount between about 0.10 and 0.75 pound per ton of feed.

9. A process according to claim 1 further characterized in that:
  (A) the thickener underflow constituting the anionic flotation feed is first conditioned with causticized starch, then with calcium chloride and finally with fatty acid,
  (B) said conditioned flotation feed is subjected to an initial rougher flotation stage,
  (C) the froth from said rougher flotation is subjected to at least one scavenger flotation stage, the froth from said scavenger flotation being discarded as tailings,
  (D) the underflow from said scavenger flotation is recycled for combination with the rougher feed, and
  (E) the underflow from said rougher flotation is recovered as the anionic silica flotation concentrate.

10. A process according to claim 9 further characterized in that:
  (A) said starch is pearl starch present in amount between about 4 to 12 pounds per ton of anionic silica flotation feed,
  (B) caustic is present in amount between about 4 to 12 pounds per ton of feed, (C) calcium chloride is present in amount between about 1 to 3 pounds per ton of feed, and (D) fatty acid is present in amount between about 1 to 5 pounds per ton of feed.

11. A process according to claim 1 further characterized in that the cationic silica flotation concentrate and the anionic silica flotation concentrate are combined and agglomerated.

References Cited

UNITED STATES PATENTS

| | | | |
|---|---|---|---|
| 2,075,466 | 3/1937 | Queneau | 241—20 X |
| 2,352,324 | 6/1944 | Hubler | 241—20 |
| 2,526,519 | 10/1950 | Jorgensen | 241—20 |
| 2,551,893 | 5/1951 | Morton | 241—20 |
| 2,557,059 | 6/1951 | Marchi | 241—24 X |
| 2,558,635 | 6/1951 | Vedensky | 241—24 X |
| 2,570,120 | 10/1951 | Handley | 241—20 |
| 3,067,957 | 12/1962 | Erck | 241—24 X |
| 3,337,328 | 8/1967 | Lawver | 75—3 |

ROBERT C. RIORDON, Primary Examiner

D. G. KELLY, Assistant Examiner

U.S. Cl. X.R.

75—3; 209—39, 167, 216; 241—24, 29

PO-1050
(5/69)

UNITED STATES PATENT OFFICE
CERTIFICATE OF CORRECTION

Patent No. 3,502,271      Dated March 24, 1970

Inventor(s)    Ronald M. Hays

It is certified that error appears in the above-identified patent and that said Letters Patent are hereby corrected as shown below:

Column 2, line 8, "shiped" should be --shipped--

Table I, lines 8-9, "Cationic silica flotation concentration" should be --Cationic silica flotation concentrate--

Table I, column 7 under heading "II Percent Wt.", line 7, "13.38" should be --14.38--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents